United States Patent
Nakamura et al.

(10) Patent No.: US 7,232,853 B2
(45) Date of Patent: Jun. 19, 2007

(54) PRODUCTION PROCESS OF COLORED FINE PARTICULATE RESINS, COLORED FINE PARTICULATE RESINS, AND COLORING PROCESS OF ARTICLES

(75) Inventors: Michiei Nakamura, Tokyo (JP); Shigeru Takarada, Tokyo (JP); Hiroyuki Shimanaka, Tokyo (JP); Kotaro Ohshima, Tokyo (JP); Shinya Tuchida, Tokyo (JP)

(73) Assignee: Dainichiseika Color & Chemicals Mfg. Co., Ltd., Tokyo (JP)

(*) Notice: Subject to any disclaimer, the term of this patent is extended or adjusted under 35 U.S.C. 154(b) by 577 days.

(21) Appl. No.: 10/033,897

(22) Filed: Jan. 3, 2002

(65) Prior Publication Data
US 2002/0128356 A1   Sep. 12, 2002

(30) Foreign Application Priority Data
Jan. 10, 2001  (JP) ............................. 2001-002497

(51) Int. Cl.
*B22F 1/00*   (2006.01)
(52) U.S. Cl. ...................................... 524/1; 528/502 R
(58) Field of Classification Search ........... 604/385.01, 604/385.03, 385.04, 385.05, 385.17, 368; 524/1; 528/502 R
See application file for complete search history.

(56) References Cited

U.S. PATENT DOCUMENTS 3,449,291 A * 6/1969 Bartsch et al. ............... 524/562
6,258,503 B1   7/2001 Nakamura et al.

FOREIGN PATENT DOCUMENTS

CA   2083830   7/1991

* cited by examiner

Primary Examiner—Edward J. Cain
(74) Attorney, Agent, or Firm—Oblon, Spivak, McClelland, Maier & Neustadt, P.C.

(57) ABSTRACT

Colored fine particulate resins can each be produced by bringing a colored resin, which comprises a thermally fusible resin and a colorant evenly distributed in the thermally fusible resin, into a molten state; forming the colored resin, which is in the molten state, into droplet-shaped fine particles in a non-dissolving medium which does not dissolve the colored resin; and then cooling and solidifying the droplet-shaped fine particles. The colored fine particulate resins are useful in image recording materials, printing materials and paints. Articles can be colored with the image recording materials, printing materials or paints.

20 Claims, No Drawings

PRODUCTION PROCESS OF COLORED FINE PARTICULATE RESINS, COLORED FINE PARTICULATE RESINS, AND COLORING PROCESS OF ARTICLES

BACKGROUND OF THE INVENTION a) Field of the Invention

This invention relates to a process for producing colored fine particulate resins, colored fine particulate resins, and a process for coloring articles by using the colored fine particulate resins. More specifically, the present invention is concerned with the provision of a process for economically producing colored fine particulate resins, especially colored fine particulate resins useful as colorants for image recording materials such as developers for electrophotography and ink-jet printing inks, printing inks, powder coatings and slurry paints by production steps rationalized for mass production.

b) Description of the Related Art

A dry developer for electrophotography, which may hereinafter be called simply "a developer", has conventionally be produced by so-called crush granulation, that is, by coarsely grinding a colored resin with a crusher or the like, finely grinding the coarsely-ground, colored resin with a mill such as a jet mill, and then removing coarse particles and dust with an air classifier. The colored resin can be obtained by metering, mixing and kneading a resin for the developer, a colorant and optional internal additives such as a charge control agent such that the colorant and optional internal additives are dissolved or dispersed in the resin.

It is proposed in JP 11-49864 A that in the above-described production process, production steps such as grinding of the resin, metering of the materials for each batch, and mixing in a tumbler or Henschel mixer can be improved by feeding the resin into an extruder, feeding the colorant and internal additives through automatic metering devices, and kneading the colorant and internal additives with the molten resin in the extruder.

The above-described crush granulation is, however, accompanied by a drawback in that production machines employed in the process, for example, a mill such as a jet mill and an air classifier are very expensive. On the other hand, developers have been finding increasing utility in various environments owing to popularization of office automation equipment. Keeping in step with this move, new requirements have arisen for developers, including use of a resin having a higher glass transition point as an anti-blocking measure and the like for improved storability; and changes of production conditions to meet the move toward developers of finer particle size, and more precise control of production conditions from the standpoint of a desire for image quality of higher definition.

This, however, has made it more difficult to produce a target product efficiently at low cost, because the need for feeding of the required components at controlled rates into a grinder and the need for providing the product with a smaller particle size and narrower particle size distribution have led to a reduction in productivity. Moreover, if these production conditions cannot be met by the existing equipment, an economical problem also arises in that a change to or introduction of new production machine or machines is needed. In addition, a developer produced by crush granulation is in the form of crushed particles of irregular shapes, and the distribution of surface charges is uneven. Compared with a spherical developer produced by suspension polymerization or the like, the production of a developer by crush granulation results in occurrence of residual dust in a greater amount, said residual dust being insufficient in performance as a developer, and is not economical.

SUMMARY OF THE INVENTION

The present inventors have proceeded with an extensive investigation to solve the above-described problems and to develop an economical and rational process for the mass production of a colored fine particulate resin of uniform shape and properties. As a result, it was found that a colored resin can be obtained in the form of fine spherical particles by forming a colored resin, which is in a molten state, into droplets in a non-dissolving medium, cooling and solidifying the droplets to form the colored resin into fine particles, collecting the fine particles by filtration, and then washing and drying the fine particles. It was also found that this process does not require milling and classifying steps unlike the above-described various conventional processes, permits mass production of a colored fine particulate resin of uniform spherical shape (for example, a dry developer for electrophotography) through rationalized production steps, and is also excellent in economy. Based on such findings, the present inventors proceeded further with the investigation to provide a colored particulate resin, especially a developer for electrophotography, resulting in the completion of the present invention. Incidentally, the term "non-dissolving liquid medium" or "non-dissolving medium" as used herein means a liquid or gas which practically does not dissolve a colored resin.

In one aspect of the present invention, there is thus provided a process for producing a colored fine particulate resin (which may hereinafter be called simply "colored fine particles"), which comprises the following steps:

bringing a colored resin, which comprises a thermally fusible resin (binder resin) and a colorant evenly distributed in the thermally fusible resin, into a molten state;

forming the colored resin, which is in the molten state, into droplet-shaped fine particles in a non-dissolving medium which does not dissolve the colored resin; and then cooling and solidifying the droplet-shaped fine particles.

In another aspect of the present invention, there is also provided a colored fine particulate resin produced by the process. The is useful, for example, in an image recording material, printing material or paint.

In a further aspect of the present invention, there is also provided a process for coloring an article, which comprises coloring the article with the image recording material, printing material or paint.

Upon production of a colored fine particulate resin, for example, a dry developer for electrophotography, it has conventionally been the main stream to use so-called crush granulation, that is, to perform fine grinding by a mill such as a jet mill and to remove coarse particles and dust by a classifier. However, this conventional production process requires very expensive production machines, and is experiencing increasing difficulties in producing the target product efficiently at low cost due to severer production conditions for the formation of a dry developer into finer particles, a decrease in processed amount, a reduction in productivity, and the like, which are required or have arisen to meet the recent requirement for copy quality of higher definition. Moreover, a developer produced by crush granulation is in the form of crushed particles of irregular shapes, and the distribution of surface charges is uneven. Crush granulation is accompanied by occurrence of residual dust in a greater amount, said residual dust being insufficient in performance as a developer, and is not economical.

According to the present invention, on the other hand, colored fine particles which are uniform in both shape and properties and are useful especially as a developer for electrophotography can be mass-produced economically through rationalized production steps by forming a colored resin into fine particles in a non-dissolving medium such as a poor solvent or non-solvent liquid, cooling and solidifying the fine particles and, if necessary, collecting the fine particles by filtration and then drying the same, without requiring fine grinding and classification steps as essential steps unlike the various conventional processes. In addition, the colored resin can be used for various coloring applications, for example, for image recording materials, different colored resins, paints, printing inks and the like by forming it into particle sizes suitably predetermined corresponding to the respective coloring applications. In particular, the colored resin is useful for the production of dry developers for electrophotography, image recording materials as a color such as an ink-jet printing ink, printing inks, electrostatic powder coatings, fluidized bed powder coatings, and slurry paste paints.

DETAILED DESCRIPTION OF THE INVENTION AND PREFERRED EMBODIMENTS

The present invention will next be described in further detail based on preferred embodiments. The colored resin useful in the practice of the present invention comprises a conventionally-known resin, which has been used specifically in an image recording material, powder coating or slurry paint, and a colorant. Described more specifically, the colored resin useful in the practice of the present invention comprises a thermally fusible resin as its resin, and has been obtained by uniformly distributing, specifically dispersing or dissolving the colorant and optional internal additives—such as a charge control agent, wax, crosslinking agent, light stabilizer and/or ultraviolet absorber—in the thermally fusible resin. The colorant or the colorant and internal additives will hereinafter be called collectively "colorant and the like".

The process for forming the colored resin into fine particles in the present invention features forming the colored resin, which is in a molten state, into droplet-shaped fine particles in a non-dissolving medium and then cooling and solidifying them, and is a fine-particle-forming process which requires neither a crushing step nor a classification step as an essential step unlike the conventional technology. Examples of such a process can include the following processes:

(1) A colored resin, which is in a molten form, is emulsified or dispersed in the form of droplet-shaped fine particles in a non-dissolving liquid medium, and is then cooled such that the colored fine particles, which are in the molten state, are solidified (hereinafter called "the emulsion-dependent, fine-particle-forming process");

(2) A colored resin, which is in a molten state, is injected, dispersed or sprayed into a cooled, inert liquid or gaseous medium such that the resulting fine particulate droplets are cooled and solidified (hereinafter called "the dispersed-cooling, fine-particle-forming process"); and (3) A process making combined use of the above processes (1) and (2).

In the step in which the fused, colored resin is formed into droplets, it is necessary to keep the fused colored resin at as low a viscosity as possible. For this purpose, it is desired to make crystals of the resin completely melt by setting the temperature of the non-dissolving medium at a level which falls within a range, in which the resin is not decomposed, and is higher than the softening point of the resin. In the cooling and solidifying step, on the other hand, it is desired to cool the resulting fine particulate droplets at as low a temperature as possible so that the droplets are cooled and solidified without gathering together. For example, the temperature of the non-dissolving medium may be set at about 80° C. to 200° C., preferably about 100° C. to 160° C. in the droplet-forming step of the colored resin, and at about −10° C. to 20° C., preferably about 0° C. to 10° C. in the solidifying step.

Upon formation of the colored resin into droplets, addition of colloidal silica, an inorganic salt, a high-molecular protective colloid or the like as an anti-gathering agent into the non-dissolving medium is preferred for preventing the resulting droplets from gathering together. The colored fine particles so formed are collected by filtration, washed and then dried. If coarse particles or agglomerated fine particles are formed, it is also preferred to crush them by using a crushing or grinding machine in the course of the production as needed. If coarse particles or dust is formed, it is also preferred to separate or remove them by using an automatic sifter or classifier or the like in the course of the production as needed. The above-described formation of the fused, colored resin into droplets, solidification, crushing, classification and the like will also be commonly applied to processes to be described subsequently herein. The melting of the colored resin may be effected under either environmental pressure or elevated pressure.

The non-dissolving medium employed in each of the above-described processes is a poor solvent or a non-solvent liquid, which practically does not dissolve the colored resin. Described specifically, particularly preferred examples of liquid media can include glycols such as ethylene glycol, propylene glycol, diethylene glycol, dipropylene glycol, polyethylene glycol and polypropylene glycol; derivatives of these glycols, such as their mono and dialkyl ethers, their mono or dicarboxylic acid esters, and their monoalkyl ether monocarboxylic acid esters; glycerin, diglycerin and polyglycerins; silicone oils; mineral terpene, kerosine, and illuminating kerosine, and hydrocarbon solvents available under trade names such as "Isopar" (product of Exxon Chemical Japan Ltd.), "SHELL SOL" (product of Shell Japan Ltd.) and "HYSOL" (product of Nippon Petrochemicals Co., Ltd.); higher fatty acid esters, higher fatty acid triglycerides, and vegetable oils; water; mixed media of water and water-soluble organic solvents, such as water-alcohol, water-ketone and water-glycol ether. Illustrative of gaseous media, on the other hand, are air of environmental temperature, air cooled with water or a coolant, and air cooled by mixing gas cooled with liquid nitrogen or dry ice.

The above-described individual processes will hereinafter be described in detail.

The "emulsion-dependent, fine-particle-forming process" (1) includes embodiments as will be described next.

(a) A colored resin in a molten state is dispersed in the form of droplet-shaped fine particles in a non-dissolving liquid medium under high-speed stirring or with impact or impulsive force, followed by cooling and solidification into fine particles. According to this process, strong shearing stress is applied to break and disperse the colored resin. As equipment, a conventionally used emulsifier such as a high-speed agitation emulsifier, a high-pressure impact emulsifier, a pressure-resistant high-speed agitator or an extruder can be mentioned.

The rotational speed of agitating blades in these equipment varies depending upon the particle size required for the colored fine particles to be obtained, the melt viscosity of the colored resin, the viscosity of the non-dissolving liquid medium, and the like, and therefore, cannot be specified in a wholesale manner. It is hence necessary to conduct a preliminary investigation beforehand. For example, when the particle size required for the colored fine particles is in the range of from 7 µm to 10 µm, it is preferred to set the rotational speed at about 6,000 to 20,000 rpm, preferably at about 7,000 to 15,000 rpm as a standard and to proceed with the dispersing processing while checking the particle size of the resulting colored fine particles by an optical microscope or a particle size distribution analyzer.

(b) A colored resin in a molten state is injected into a non-dissolving medium through small openings of a porous or multi-opening material to disperse the colored resin in the form of droplet-shaped fine particles, followed by cooling and solidification. Usable examples of the porous or multi-opening material include a variety of porous or multi-opening sheets, each of which is provided with openings small enough to prepare fine particles of desired particle size. As the physical properties, strength and chemical fastness of the material of the porous or multi-opening sheet, it is required for the material that, when heated under environmental pressure or elevated pressure upon production, it does not undergo deformation or breakage and remains chemically stable and inert with the used non-dissolving liquid medium or the fused, colored resin. Specific examples can include a perforated sheet of stainless steel, a perforated sheet of brass, a stainless steel net, a brass net, a porous glass film, a shirasu porous glass, and a porous ceramic.

No particular limitation is imposed on the size of the openings of the porous or multi-opening sheet, and the size of its openings varies depending upon the melt viscosity and injection speed of the colored resin and the viscosity of the non-dissolving liquid medium. As the droplet particles of the melt of the colored resin generally become greater than the diameter of the openings of the porous or multi-opening sheet, a porous or multi-opening sheet with openings somewhat smaller than the particle size required for the colored fine particles is used. For the example, the openings approximately have a size as small as from ½ to ⅕, preferably from ⅓ to ¼ of the particle size of the colored fine particles to be obtained. Assuming that the average particles size of colored fine particles to be obtained is in the range of from 7 to 10 µm, a diameter of from approximately 1.5 to 3 µm is desired. Using the above-described process (a) in combination, a high-speed agitation emulsifier equipped with perforated stainless steel cylinders around rotating blades maybe used, or a colored resin may be subjected to coarse emulsification and dispersion in advance by using a high-speed agitation emulsifier or a high-pressure impact emulsifier.

(c) A W/O dispersion is prepared with a non-dissolving liquid medium (water) dispersed in the form of droplets in a colored resin in a molten state. By further feeding the non-dissolving liquid medium (water), the W/O dispersion is converted into a reversed phase such that the droplet-shaped fine particles are dispersed in the non-dissolving liquid medium (water). The droplet-shaped fine particles are then cooled and solidified. According to this process, a W/O emulsion is first prepared, and water is fed further to the emulsion to convert the W/O emulsion into an O/W emulsion. Examples of equipment for use in this process can include the high-speed agitation emulsifier, the extruder and the like, which were described above under (a).

The "dispersed-cooling, fine-particle-forming process" (2) includes embodiments as will be described next.

(a) Using an injector similar to an injection unit of a head of a hot melt ink-jet printer, a colored resin in a molten state is injected through a nozzle under action of a pressure, electrical force, magnetic force or gas generation such that sub-divided droplets are injected into a cooled non-dissolving medium. The droplets are hence solidified into fine particles. In this process, a nozzle head making use of pulsation, for example, under the action of a piezoelectric element is used. As the cooled non-dissolving medium, air, nitrogen gas, cold gas from dry ice, or the above-described non-dissolving liquid medium, or the like can be used.

(b) A production system similar to a spray cooling granulation system is used. According to this process, a colored resin in a molten state is fed to a spray nozzle of the rotating disk, pressure nozzle or two-fluid nozzle type. The fused, colored resin is dispersed or sprayed into a cooled, non-dissolving medium either directly or after droplets are caused to hit the disk rotating at a high speed, and the droplet-shaped fine particles are cooled and solidified. As the cooled, non-dissolving medium, a cooling gas or non-dissolving medium similar to that mentioned above under (a) can be used.

In the above-described "emulsion-dependent, fine-particle-forming process" and "dispersed-cooling, fine-particle-forming process", a high boiling-point solvent having miscibility with the non-dissolving liquid medium can be added to lower the viscosity of the colored resin in the molten state or to make the droplets smaller. The high boiling-point solvent can be either a solvent capable of dissolving the colored resin or a solvent incapable of dissolving the colored resin. The use of the non-dissolving liquid medium in the process (1) results in multi-stage emulsification.

The colored fine particles obtained by any one of the above-described processes have relatively uniform and even shapes, because under the action of surface tension of each molten droplet of the colored resin in the non-dissolving medium, each molten droplet takes a spherical or prolate spheroidal shape and its particle size can also be controlled by setting conditions in advance and in the course of the production. Compared with colored fine particles of irregular shapes obtained by crush granulation as conventional art, the colored fine particles obtained by the process of the present invention, therefore, have superior electrical properties such as chargeability in applications such as developers for electrophotography and powder coatings or superior properties in applications such as image recording materials and paints.

Usable as the thermally fusible resin for use in the present invention are condensation polymerization resins, addition polymerization resins and mixtures thereof, all of which have conventionally been used in such various applications as described above. Especially, condensation polymerization resins having hydrocarbon rings are very preferred because, even if they have relatively low molecular weights, they show high glass transition points owing to the crystalinity available from the hydrocarbon rings and have low melt viscosities for their relatively low molecular weights.

Examples of the above-described condensation polymerization resins—the glass transition points and melt viscosities of which are high and low, respectively—can include especially polyester resins, epoxy resins and the like, each which contains hydrocarbon rings, for example, aromatic rings such as benzene rings or naphthalene rings or alicyclic rings such as cyclohexane rings. Polyester resins having aromatic rings or alicyclic rings can each be obtained using a diol having one or more of such rings and/or a dicarboxylic acid having one or more of such rings.

Illustrative of the diol having one or more aromatic rings or alicyclic rings are $(C_2-C_4)$alkylene oxide adducts of bisphenols such as bisphenol A, bisphenol F and bisphenol S, and their hydrogenation products; p-xylene glycol; bis(hydroxyethoxy)benzene; 1,4-cyclohexanediol; 1,4-cyclohexanedimethanol.

Illustrative of the dicarboxylic acid having one or more aromatic rings or alicyclic rings are terephthalic acid, isophthalic acid, 1,4-cyclohexanedicarboxylic acid, cyclohexene-1,2-dicarboxylic acid, and methylnadic acid; and their lower alkyl esters, acid halides, and acid anhydrides.

Examples of the alicyclic dicarboxylic acid usable together with these diols, each of which has one or more aromatic rings or alicyclic rings, can include maleic acid, fumaric acid, adipic acid, sebasic acid and azelaic acid. Examples of the aliphatic diol usable together with these dicarboxylic acids, each of which has one or more aromatic rings or alicyclic rings, can include ethylene glycol, propylene glycol, butylene glycol, hexylene glycol, neopentyl glycol, diethylene glycol, and dipropylene glycol.

Each of these polyester resins each of which has one or more aromatic rings or alicyclic rings has a glass transition point of about 50° C. or higher, particularly preferably of from 50° C. to 65° C., a softening point of from about 100° C. to 150° C., preferably from 100 to 130° C., has sharp melt property of a narrow melting temperature width, and is solid at room temperature. The preferred weight average molecular weight of the resin is from about 1,000 to 50,000, preferably from 3,000 to 10,000.

Examples of the epoxy resin can include polyglycidyl-ether-type epoxy resins of bisphenols such as bisphenol A, bisphenol F and bisphenol S; and their ester derivatives. The preferred weight average molecular weight of the epoxy resin is from about 1,000 to 50,000, preferably from 3,000 to 10,000.

Illustrative of the addition polymerization resins are (co)polymers each of which has a high glass-transition point and a relatively low molecular weight. Illustrative are styrene-(meth)acrylate copolymers, styrene-maleate copolymers, methacrylate copolymers, methacrylate-acrylate copolymers, and styrene-butadiene copolymers. Usable as these addition polymerization resins are copolymers, which are used in the crushing-classification process for the production of conventional dry developers and are relatively low in average molecular weight. Incidentally, conventional spherical dry developers making use of addition polymerization resins can include so-called polymerization process toners which are obtained using suspension polymerization. Because of characteristics of suspension polymerization, however, the resulting addition polymerization resins have higher molecular weights.

In the above-described processes of the present invention for the production of colored fine particles, it is important that the colored resin melts and has a molten viscous state, in other words, a melt viscosity suited for its fine-particle-forming process. Although the melt viscosity of the colored resin and that of the resin used for the preparation of the colored resin vary in data depending upon the measuring method, each melt viscosity referred to in the present invention is a melt viscosity (Pa·s) as measured under the following measuring conditions by using "Capillograph 1C" (trade name; manufactured by Toyo Seiki Seisaku-Sho, Ltd.) designed and manufactured in accordance with the "Testing Method of Flow Characteristics of Thermoplastic Plastics by Capillary Rheometer" (JIS K7199) in which melt characteristics of a thermally fusible resin are measured by allowing the resin to flow down through a capillary.

| | |
|---|---|
| Capillary: | 1.0 mm in diameter (D), 10.0 mm in length (L), L/D = 10. |
| Barrel: | 9.55 mm in diameter. |
| Retention time: | 3 minutes. |

A relationship between piston speeds and the corresponding shear rates in the "Capillograph 1C" is presented in Table 1.

TABLE 1

Relationship between Piston Speed and Shear Rate in Viscometer

| Piston speed (mm/min) | Shear rate $(sec^{-1})$ | Piston speed (mm/min) | Shear rate $(sec^{-1})$ |
|---|---|---|---|
| 10 | 122 | 100 | 1216 |
| 20 | 243 | 200 | 2432 |
| 50 | 608 | 500 | 6080 |

Monomers, weight average molecular weight (Mw) as measured by GPC and converted based on that of polystyrene, and thermal properties (glass transition points Tg and melting points Tm) of thermally fusible polystyrene resins (R-1 to R-6) as examples of resins usable in dry developers for electrophotography in the present invention are presented in Table 2.

TABLE 2

Compositions and Properties of Resins

| | Monomer components of resin | | Properties of resin | | |
|---|---|---|---|---|---|
| Resin | Dicarboxylic acid component | Diol component | Mw (×10,000) | Tg (° C.) | Tm (° C.) |
| R-1 | Terephthalic acid | BPA-EO | 1.2 | 60 | 100 |
| R-2 | Telephthalic acid | BPA-PO | 0.6 | 55 | 100 |
| R-3 | Telephthalic acid/fumaric acid | BPA-PO | 1.3 | 46 | 92 |
| R-4 | Telephthalic acid | BPA-EO/CHDM | 1.4 | 64 | 108 |
| R-5 | Fumaric acid | BPA-PO | 2.5 | 55 | 104 |
| R-6 | Telephthalic acid | BPA-PO | 2.7 | 64 | 115 |

(Note)
BPA-EO: Bisphenol A-ethylene oxide adduct
BPA-PO: Bisphenol A-propylene oxide adduct
CHDM: Cylohexanedimethanol
Mw: Weight average molecular weight
Tg: Glass transition point measured by a differential scanning calorimeter
Tm: Melting point measured by a differential scanning calorimeter To investigate the relationship between the composition of each resin and its physical properties and fusing temperature, the melt viscosities of the above-described thermally fusible polyester resins (R-1 to R-6) at 120° C. to 160° C. were measured. The results are presented below in Table 3.

TABLE 3

Relationship between Fusing Temperatures
and Melt Viscosities of Resins

| Resin | Piston speed (mm/min) | Fusing temperature (° C.) | | | | |
|---|---|---|---|---|---|---|
| | | 120 | 130 | 140 | 150 | 160 |
| | | Melt viscosity (Pa · s) | | | | |
| R-1 | 20 | 153 | 20 | 7 | 4 | 5 |
| R-2 | 50 | 2 | 2 | — | — | — |
| R-3 | 20 | 20 | 40 | — | 3 | — |
| R-4 | 10 | 21 | 21 | 21 | 15 | 4 |
| R-5 | 50 | 186 | 77 | 35 | 7 | 4 |
| R-6 | 10 | 322 | 160 | 40 | 8 | 6 |

From the measurement data described above, it has been found that it is the temperature condition that affects most significantly the melt viscosity of a resin, that at a low temperature close to a lower limit of the fusing temperature, the melt has a high viscosity and exhibits extraordinary viscosity properties, and that a temperature higher than such a low temperature is needed to impart normal melt viscosity. It has also been found that the melt viscosity drops substantially and stabilizes as the fusing temperature is raised.

Turning next to influence of the molecular weight of a resin on its properties and physical properties, a resin low in average molecular weight melts at a low temperature. A resin low in softening point is low in viscosity and stabilizes at lower temperatures. At high temperatures, glass transition point considerably affects the viscosity. A resin high in glass transition point requires a higher temperature to lower its melt viscosity.

Further, the melt viscosity of a colored resin at a given temperature is dependent significantly on the melt viscosity of the resin, which was used to prepare the colored resin, at the same temperature, and is also affected by the added pigment, charge control agent and the like. The value of melt viscosity, therefore, varies from one colored resin to another. Accordingly, upon forming a colored resin into fine particles, the colored resin is prepared, and by the above-described "Capillograph 1C", its melt viscosity is measured at varied fusing temperatures and piston speeds. The melt viscosity also differs depending upon the fine-particle-forming process, and cannot be specified in a wholesale manner. It is, however, preferred to set the fusing temperature such that the melt viscosity falls within a viscosity range of from about 1 to 500 Pa·s, preferably from 1 to 100 Pa·s, and to form the fused colored resin into fine particles under the thus-set temperature condition in accordance with the above-described procedure. The temperature condition may range, for example from about 80° C. to 180° C., with a range of from 90° C. to 160° C. being preferred.

The colored resin is produced by adding the colorant and the like to the above-described resin, and no particular limitation is imposed on its production process. For example, the color resin can be produced as proposed in JP 11-49864 A, namely, by feeding a resin into an extruder, also feeding the colorant and the like through their respective automatic metering devices into the extruder, and kneading the colorant and the like with the molten resin in the extruder.

Especially when the resin is a resin obtained by a condensation polymerization reaction like a polyester resin, a rationalized production process can be used, for example, as proposed in JP 11-46894 A. According to this process, the colorant and the like are either dissolved or dispersed in individual stages of synthesis of the resin, that is, into raw material components, the resin in the course of the polymerization reaction, the resin in a molten state after the completion of the polymerization, and/or the resin taken out in a molten state from a reaction vessel. If the polymerization reaction is still on the way, the reaction is allowed to proceed further to completion. Colored resins obtained by these processes can each be formed into fine particles in a non-dissolving medium by such a procedure as described above.

As the process of the present invention for the production of colored fine particles, it is particularly preferred to feed a polyester resin, which has been obtained by a condensation polymerization reaction, directly in a molten state or in the form of fine particles into an extruder via an automatic metering device, feeding a colorant and the like into the extruder via their corresponding automatic metering devices, and adding the colorant and the like into the resin. From the standpoint of production steps, it is most rational and economical to subsequently form the thus-obtained colored resin into fine particles in the above-described non-dissolving medium.

The colorant and the like for use in the present invention can include, in addition to the colorant, internal additives such as a charge control agent, a ferromagnetic material, a wax, a crosslinking agent, a light stabilizer and an ultraviolet absorber. No particular limitations are imposed on their kinds and amounts. The colorant may comprise one or more colorants selected from oil-soluble dyes of chromatic or black colors, dispersible dyes, organic pigments, carbon black pigment and inorganic pigments, fine ferromagnetic materials, and white organic pigments and inorganic pigments. Examples of the colorant can include organic pigments such as azo pigments, high molecular weight azo pigments, azomethine-containing azo pigments, azomethine pigments, anthraquinone pigments, phthalocyanine pigments, perynone/perylene pigments, indigo/thioindigo pigments, dioxazine pigments, quinacridone pigments, isoindolinone pigments, isoindoline pigments, diketopyrrolopryrrole pigments, quinophthalone pigments, metal complex pigments, and aniline black; and inorganic pigments such as iron oxide pigments, composite oxide pigments, and titanium oxide pigments.

Illustrative of the charge control agent as an internal additive to developers for electrophotography are salicylic acid-metal complexes, azo dye-metal complexes, and cationic compounds. Illustrative of the ferromagnetic material are conventionally-known fine ferromagnetic materials such as black, brown or reddish brown magnetic iron oxides and magnetic metals. Examples of the wax can include conventionally-known waxes, for example, high fatty acid esters such as stearyl palmitate, stearyl stearate, behenyl behenate, behenyl stearate, stearyl behenate, and hydroxystearic acid glyceride; paraffin waxes; polyethylene oligomers, ethylene copolymer oligomers, and propylene oligomers. Internal additives usable in applications such as powder coatings can include, for example, crosslinking agents, light stabilizers, ultraviolet absorbers and fluidizing agents.

When the colored resin is used for the production of a dry developer, a charge control agent, a fluidizing agent, a wax and/or a ferromagnetic material are added, as needed, along with a colorant. The contents of the colorant and internal additives, such as the charge control agent, in the resin are similar to the corresponding contents in the developers known to date. When the colorant is a pigment, for example, the content of the pigment may range from about 1 to 20 wt. %, preferably from about 2 to 8 wt. % based on the resin.

The content of a charge control agent, on the other hand, may range from about 1 to 10 wt. %, preferably from about 2 to 6 wt. % based on the resin. The content of a wax, on the other hand, may range from about 3 to 20%, with a range of from about 5 to 15% being preferred, both based on the resin.

The colorant and internal additives such as the charge control agent, which are added to the resin as described above, can also be used as high-concentration products (master batches). For example, it is also very preferred to use the colorant or charge control agent in the form of a master batch with the colorant or charge control agent finely dissolved or dispersed in the polyester resin or a resin readily miscible with the resin, that is, in the form of a high-concentration pigment-resin composition or a high-concentration charge control agent-resin composition. The content of the colorant or the like in the master batch may range from about 10 to 70 wt. %, preferably from about 20 to 50 wt. %.

As the resin for use in the present invention has a low melt viscosity, a dry developer, powder coating or the like which is obtained using the colored fine particles exhibits superb properties such as excellent fixability, color-developing property, vividness and coat smoothness when images or coatings are formed on base materials such as paper sheets, films, metal sheets or plates of iron, aluminum or magnesium, or molded products.

The colored fine particles according to the present invention are useful in conventionally-known coloring applications in which colored fine particles are used. As mentioned above, they can be used as a colorant in dry developers for electrophotography, image recording materials such as ink-jet printing inks, printing inks, electrostatic powder coatings, fluidized bed powder coatings, and slurry paste paints; and can also be used for coloring articles with such products by methods such as image recording, printing and coating.

The present invention will next be described specifically based on Examples, in which all designations of "parts" or "part" and "%" are on a weight basis.

EXAMPLE 1

[1] Production of High-Concentration Products (Master Batches) of Pigment and Charge Control Agent Master batches of pigments and a charge control agent were each prepared by provisionally mixing fine particles (70 parts) of a polyester resin (Resin R-1), which had been obtained by the below-described process, and the corresponding one(s) of the below-described pigments, pigment derivatives and charge control agent in a high-speed mixer, sufficiently kneading the resulting mass in a twin-screw extruder, cooling the resulting pellets, and then coarsely grinding the thus-cooled pellets.

Resin R-1 used as described above was a polyester resin of the bisphenol A type, which had been obtained by subjecting terephthalic acid and a propylene oxide adduct of bisphenol A (hydroxyl value: 321) to condensation polymerization at a molar ratio of 1:1 in the presence of tetrabutyl titanate as a condensing catalyst. The properties of the resin are shown above in Table 2, and the melt viscosities of the resin at varied fusing temperatures are presented above in Table 3.

Incidentally, the pigments, pigment derivatives and charge control agent used in the above procedure were as follows:

Yellow pigment: A mixture of C.I. Pigment Yellow 128 (27 parts) and phthalimidomethylated disanthraquinonyl-monophenylamino-s-triazine (3 parts).

Red pigment: A mixture of C.I. Pigment Red 122 (27 parts) and phthalimidomethylated dimethylquinacridone (3 parts).

Blue pigment: A mixture of C.I. Pigment Blue 15:3 (27 parts) and phthalimidomethylated copper phthalocyanine (3 parts).

Black pigment: A mixture of C.I. Pigment Black 6 (27 parts) and phthalimidomethylated copper phthalocyanine (3 parts)

Charge control agent: Negative charge control agent of the chromium complex type (30 parts).

[2] Production of Colored Resins

The feed rate of a resin at an automatic metering device of a twin-screw extruder and the feed rate of one of the master batches at an automatic metering unit of a side feeder arranged at an intermediate part of a cylinder of the extruder were set beforehand to give the proportions shown below in Table 4. The polyester resin (Resin R-1) was fed into a hopper of the twin-screw molder via the automatic metering device, while a crushed powder of the one of the master batches was automatically metered and fed by the automatic metering unit and was then injected and added into the cylinder of the extruder. Within the extruder, the crushed powder was kneaded with the polyester resin which had been brought into a molten state. The colored resin was then discharged in the form of a thin film, cooled, and then coarsely crushed into flakes.

TABLE 4

Formulations for Production of Colored Resins

| Formulation (parts) | Colored resin | | | |
|---|---|---|---|---|
| | Yellow | Red | Blue | Black |
| Resin R-1 | 76.7 | 72.4 | 78.3 | 72.4 |
| Yellow master batch | 14.0 | — | — | — |
| Red master batch | — | 18.3 | — | — |
| Blue master batch | — | — | 12.4 | — |
| Black master batch | — | — | — | 18.3 |
| Charge control agent master batch | 9.3 | 9.3 | 9.3 | 9.3 |
| Color developed with developer | Yellow | Red | Blue | Black |

Melt viscosities of the thus-obtained, respective colored resins of yellow, red, blue and black colors are presented below in Table 5. The piston speeds in the table were piston speeds in a viscometer ("Capillograph 1C"). The colored resins were not sufficiently lowered in melt viscosity at 130° C., and showed stable low viscosities at approximately 140° C. to 150° C.

TABLE 5

Relationship between Fusing Temperatures and Melt Viscosities of Colored Resin

| Colored resin | Piston speed (mm/min) | Melt viscosity (Pa · s) | | |
|---|---|---|---|---|
| | | 130° C. | 140° C. | 150° C. |
| Yellow resin | 50 | 85 | 40 | 19 |
| | 100 | 77 | 37 | 18 |
| | 200 | 69 | 33 | 17 |
| | 500 | 53 | 28 | 15 |
| Red resin | 50 | 96 | 41 | — |
| | 100 | 87 | 39 | — |
| | 200 | 77 | 37 | — |
| | 500 | 57 | 31 | — |

TABLE 5-continued

Relationship between Fusing Temperatures and Melt Viscosities of Colored Resin

| Colored resin | Piston speed (mm/min) | Melt viscosity (Pa · s) | | |
|---|---|---|---|---|
| | | 130° C. | 140° C. | 150° C. |
| Blue resin | 50 | 80 | 36 | — |
| | 100 | 73 | 34 | — |
| | 200 | 66 | 31 | — |
| | 500 | 51 | 26 | — |
| Black resin | 50 | 123 | 53 | 37 |
| | 100 | 239 | 55 | 34 |
| | 200 | 92 | 49 | 30 |
| | 500 | 67 | — | — |

[3] Production of Colored Fine Particles (Developers for Electrophotography) ("Emulsion-Dependent, Fine-Particle-Forming Process")

(1) Blue Developer for Electrophotography

Ethylene glycol was chosen as a non-dissolving liquid medium for forming the blue resin into particles. In view of the measurement results of melt viscosities of the blue resin at varied fusing temperatures presented in Table 5, the temperature of ethylene glycol as the liquid medium was set at 150° C. Into a stainless steel vessel fitted with a heater and an agitator, ethylene glycol (300 parts) and a 20% dispersion (100 parts) of silica in ethylene glycol were charged. The contents were agitated to disperse the silica.

Into the dispersion, blue resin flakes (500 parts) which had been obtained as described above was added. After the resulting mixture was agitated to disperse the blue resin, the resulting dispersion was heated to about 150° C. so that the blue resin flakes was caused to melt. On the side, ethylene glycol (100 parts) and a 20% dispersion (100 parts) of silica in ethylene glycol were charged into a stainless steel vessel fitted with a heater and a high-speed agitator, followed by heating to 150° C. to provide an outer bath.

Through a porous glass plate the average opening size of which was 2.7 μm, the above-prepared dispersion of the fused blue resin in ethylene glycol was injected under pressure into the outer batch maintained under agitation at high speed. By the porous glass plate, the fused blue resin was dispersed in the form of droplet-shaped fine particles. While continuing the high-speed agitation of the outer bath, the progress of formation into fine particles was observed periodically under a microscope. After confirming that most fine particles fell in the particle size range of from 5 to 10 μm, the outer bath was cooled. After the temperature of the outer batch was lowered to room temperature, solidified fine blue particles were collected by filtration, thoroughly washed with water, and then dried to obtain uniform fine blue particles of the present invention in a spherical form having an average particle size of about 8 μm.

To the fine particles, colloidal silica was added as a fluidizing agent in a manner known per se in the art, followed by the mixing with magnetic iron powder as a carrier to afford a blue developer for electrophotography. Using the blue developer, copying was performed by a copying machine for negatively-charging two-component color development. As a result, a vivid blue image was obtained.

(2) Red, Yellow and Black Dry Developers for Electrophotography

Following the above-described fine-particle-forming process for the blue resin, uniform fine spherical particles of the red, yellow and black resins were obtained, separately. Dry developers of those colors for electrophotography were prepared in a similar manner as described above. Separately using those dry developers, copying was performed by the copying machine for negatively-charging two-component color development. As a result, vivid images of red, yellow and black colors were obtained, respectively.

Using the blue dry developer for electrophotography obtained above in the procedure (1) and the above-described red, yellow and black developers for electrophotography, copying was performed by the copying machine for negatively-charging two-component color development. As a result, a vivid full-color image of the four colors was obtained.

In a similar manner as in the above-described procedures [1] to [3] except that Resin R-1 in the formulation shown in Table 4 were replaced by Resins R-2 to R-6, respectively, dry developer for electrophotography making use of the colored fine particles of the four colors were prepared. Full-color copying was performed in a similar manner as described above. As a result, a vivid full-color image of the four colors was obtained.

Example 2

[1] Production of Colored Fine Particles (Dry Developers for Electrophotography) ("Dispersed-Cooling, Fine-Particle-Forming Process")

Provided was a molten-resin injecting, fine-particle-forming apparatus on which a heated injection head of the on-demand type making use of a piezoelectric element in a similar way as in an injection unit of a head of a hot melt ink-jet printer was mounted. The injection temperature of the heated injection head was set at 150° C. The molten-resin injecting, fine-particle-forming apparatus was also set in such a way that cold air cooled to 5° C. would be caused to flow as a cooling medium countercurrently against injected colored fine particles.

One of the colored resins of the yellow, red, blue and black colors, which had been obtained in Example 1[2], was heated to 150° C. and filled in the injection unit of the fine-particle-forming apparatus. While applying a voltage to drive the piezoelectric element, the colored resin was continuously injected and dispersed. In this manner, uniform colored fine particles of the yellow, red, blue and black colors were separately obtained in a spherical form of approximately 7 μm in average particle size. Colloidal silica was added as a fluidizing agent to the colored fine particles of the individual colors, respectively, in a manner known per se in the art, followed by the mixing of magnetic iron powder as a carrier to prepare dry developers.

Using the developers as dry developers for electrophotography, copying was performed by the copying machine for negatively-charging two-component full-color development. As a result, vivid images of yellow, red, blue and black colors and a vivid full-color image of the four colors were obtained.

Further, colored fine particles (developers for electrophotography) were also produced in a similar manner as described above except that Resins R-2 to R-6 presented in Table 2 were used in place of Resin R-1 employed in Example 1[2]. Using those developers, copying was performed by the copying machine for negatively-charging two-component full-color development. As a result, vivid single-color images and a vivid full-color image of the four colors were obtained.

Example 3

[1] Production of Colored Resins

In a similar manner as in the production of colored resins in Example 1[2], colored resins with waxes of yellow, red, blue and black colors contained therein, respectively, were produced by adding components in accordance with the formulations of the corresponding colors for the production of the colored resins presented in Table 4 of Example 1[2] except that behenyl behenate as a higher fatty acid ester was added in place of 10-part portions of Resin R-1 in the individual formulations and fully mixed with the remaining portions of Resin R-1, namely, 66.7 parts of Resin R-1 in the case of the yellow resin, 62.4 parts of Resin R-1 in the case of the red resin, 68.3 parts of Resin R-1 in the case of the blue resin, and 62.4 parts of Resin R-1 in the case of the black resin.

[2] Production of Colored Fine Particles (Dry Developers for Electrophotography) ("Dispersed-Cooling, Fine-Particle-Forming Process")

One of the colored resins of the yellow, red, blue and black colors, which had been obtained in the above procedure [1], was heated to 150° C. and filled in the injection unit of the fine-particle-forming apparatus employed in Example 2[1]. While applying a voltage to drive the piezoelectric element, the colored resin was continuously injected and dispersed. In this manner, uniform colored fine particles containing the yellow, red, blue and black waxes, respectively, were separately obtained in a spherical form of approximately 7 μm in average particle size. Colloidal silica was added as a fluidizing agent to the colored fine particles of the individual colors, respectively, in a manner known per se in the art, followed by the mixing of magnetic iron powder as a carrier to prepare dry developers.

Using the developers as dry developers for electrophotography, copying was performed by the copying machine for negatively-charging two-component full-color development. As a result, vivid images of yellow, red, blue and black colors and a vivid full-color image of the four colors were obtained.

Further, colored fine particles (developers for electrophotography) were also produced in a similar manner as described above except that Resins R-2 to R-6 presented in Table 2 were used in place of Resin R-1 employed in Example 1[2]. Using those developers, copying was performed by the copying machine for negatively-charging two-component full-color development. As a result, vivid single-color images and a vivid full-color image of the four colors were obtained.

What is claimed is:

1. A process for producing a colored fine particulate resin, which comprises the following steps:
   bringing a colored resin, which comprises a thermally fusible resin and a colorant evenly distributed in said thermally fusible resin, into a molten state;
   forming said colored resin, which is in said molten state, into droplet-shaped fine particles by injecting through small openings of a porous or multi-opening material or by a nozzle or by spraying said colored resin in said molten state in a non-dissolving medium which does not dissolve said colored resin; and then
   cooling and solidifying said droplet-shaped fine particles, wherein said colored resin in said molten state is dispersed in an emulsified form in a non-dissolving liquid medium.

2. The process according to claim 1, wherein said colored resin has a melt viscosity of from 1 to 500 Pa·s at a temperature of from 80° C. to 180° C.

3. The process according to claim 1, wherein said colored resin has a melt viscosity of from 1 to 100 Pa·s at a temperature of from 90° C. to 160° C.

4. The process according to claim 1, wherein in said forming step of said droplet-shaped fine particles, said non-dissolving medium is set at a temperature of from 80° C. to 200° C.; and said cooling and solidifying step is conducted at a temperature of from −10° C. to 20° C.

5. The process according to claim 1, wherein in said forming step of said droplet-shaped fine particles, said non-dissolving medium is set at a temperature of from 100° C. to 160° C.; and said cooling and solidifying step is conducted at a temperature of from 0° C. to 10° C.

6. The process according to claim 1, wherein said colored resin in said molten state is formed by injecting, dispersing or spraying the same into a non-dissolving liquid or gaseous medium.

7. The process according to claim 1, wherein said thermally fusible resin is a polyester resin having aromatic rings or alicyclic rings, a glass transition point not lower than 50° C., and a softening point of from 100 to 50° C.

8. The process according to claim 7, wherein said polyester resin has a weight average molecular weight of from 1,000 to 50,000.

9. The process according to claim 1, wherein said thermally fusible resin is an epoxy resin of a bisphenol polyglycidyl ether type, or an ester derivative thereof.

10. The process according to claim 9, wherein said epoxy resin or said ester derivative thereof has a weight average molecular weight of from 1,000 to 50,000.

11. The process according to claim 1, wherein said colorant is at least one colorant selected from the group consisting of a yellow pigment: a 27:3 by weight parts mixture of C.I. Pigment Yellow 128 and phthalimidomethylated disanthraquinonyl-monophenylamino-s-triazine, a red pigment: a 27:3 by weight parts mixture of C. I. Pigment Red 122 and phthalimidomethylated dimethylquinacridone, a blue pigment: a 27:3 by weight parts mixture of C.I. Pigment Blue 15:3 and phthalimidomethylated copper phthalocyanine, and a black pigment: a 27:3 by weight parts mixture of C.I. Pigment Black 6 and phthalimidomethylated copper phthalocyanine.

12. The process according to claim 1, wherein said thermally fusible resin is a polyester resin having aromatic rings or alicyclic rings or an epoxy resin having aromatic rings or alicyclic rings.

13. The process as claimed in claim 1, wherein the porous or multi-opening material is a perforated sheet of stainless steel, a perforated sheet of brass, a stainless steel net, a brass net, a porous glass film, a shirasu porous glass or a porous ceramic.

14. The process as claimed in claim 1, wherein the nozzle is a spray nozzle of the rotating disk, pressure nozzle or two-fluid nozzle type.

15. A process of making an image recording material comprising a colored fine particulate resin, said process including the process according to claim 1.

16. A process for coloring an article, which comprises coloring said article with an image recording material, produced by the process according to claim 15.

17. A process of making a printing material comprising a colored fine particulate resin, said process including the process according to claim 1.

18. A process for coloring an article, which comprises coloring said article with a printing material produced by the process according to claim 17.

19. A process of making a paint comprising a colored fine particulate resin, said process including the process according to claim 1.

20. A process for coloring an article, which comprises coloring said article with a paint produced by the process according to claim 19.

* * * * *